Feb. 14, 1950

L. B. MILLER 2,497,228

GROOVE SCRAPING DEVICE

Filed June 21, 1946

INVENTOR
Leon B. Miller.
BY
ATTORNEY

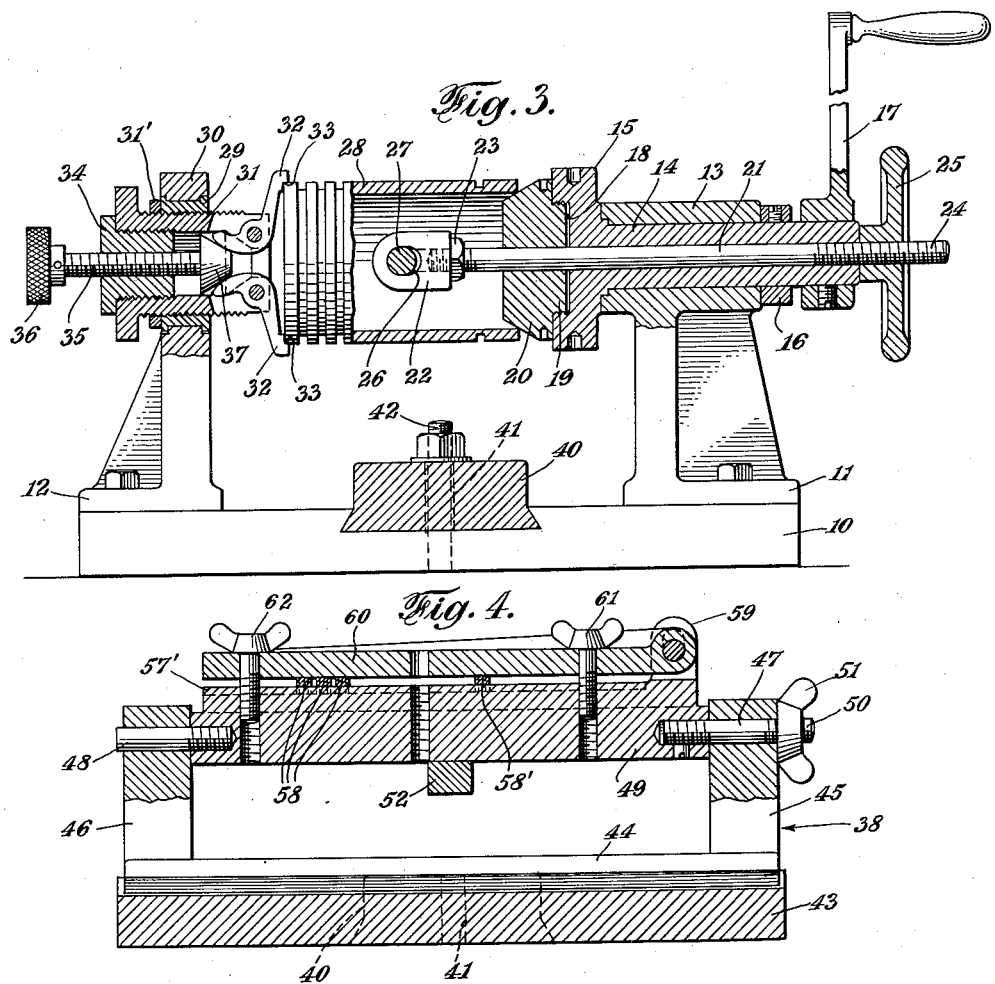

Patented Feb. 14, 1950

2,497,228

UNITED STATES PATENT OFFICE 2,497,228

GROOVE SCRAPING DEVICE

Leon B. Miller, Brooklyn, N. Y.

Application June 21, 1946, Serial No. 678,269

2 Claims. (Cl. 15—104.01)

This invention relates to piston ring groove scrapers in general, and especially to a type of groove cleaners wherein the piston moves, while the scraping blades are held in relatively fixed position.

Heretofore employed piston ring groove scrapers usually comprise a single scraping tool adapted to move relative to the piston while the latter is held in a fixed position. The tool is designed for scraping one groove at a time, thus necessitating its transfer from groove to groove for each scraping operation, and the repetition of that operation for each groove of the piston. Aside from the fact that the scraping tool must be handled as many times as there are grooves in a piston, the tool, being usually hand-operated, lacks in accuracy and efficiency and does not effect thorough cleaning of the grooves, since its engagement with the groove is very often incomplete or not sufficiently firm. As a result the carbon or other deposits in the grooves are not completely removed.

The present invention has for its prime object to provide a simple, relatively inexpensive, but highly efficient device wherein is employed at one time a number of tools corresponding to the number of grooves in a piston, and wherein the piston itself is rendered movable in respect to the tools, which are stationary, and wherein a tool holder is employed facilitating rapid and accurate adjustment of the scraping tools relative to the piston ring grooves, thereby effecting simultaneous and perfect cleaning of all the grooves in one piston during a single scraping operation.

Another object of the present invention is to provide in the device various simple means for gripping, holding and revolving a piston, and other means for centering the piston in order to assure its truly concentric movement while the grooves are being scraped.

Another object of this invention is to provide a bench type piston ring groove scraper, having a base, means for supporting and revolving a piston, means for centering either one or both ends of the piston, for holding and journaling the piston in its centered position, either at one or both ends thereof, and a tool support movable and adjustable relative to the base and being provided with a tool rest, the latter being movable in respect to said support and being adapted to facilitate adjustment and fixedly holding a set of scraping tools in proper relation to the grooves of a piston journaled in the base during the groove scraping operation.

A further object of this invention is to provide for use with the device exchangeable tools having groove-engaging and groove-cleaning tips either at one or both of their ends, and wherein the tool rest as well as the tools are provided with means for guiding and adjusting the latter in substantially parallel relation to one another.

The foregoing and numerous other objects and important advantages of the present invention will become more fully apparent from the ensuing description, in conjunction with the accompanying drawings, which latter, although held in more or less a diagrammatical form, are by no means intended to restrict the present disclosure to the actual showing, and wherein:

Fig. 3 is a front view of the device, partially in section, taken on line 3—3 of Fig. 1; and Fig. 4 is a front view, partially in section, of the tool support, taken on line 4—4 of Fig. 1.

Figure 1:
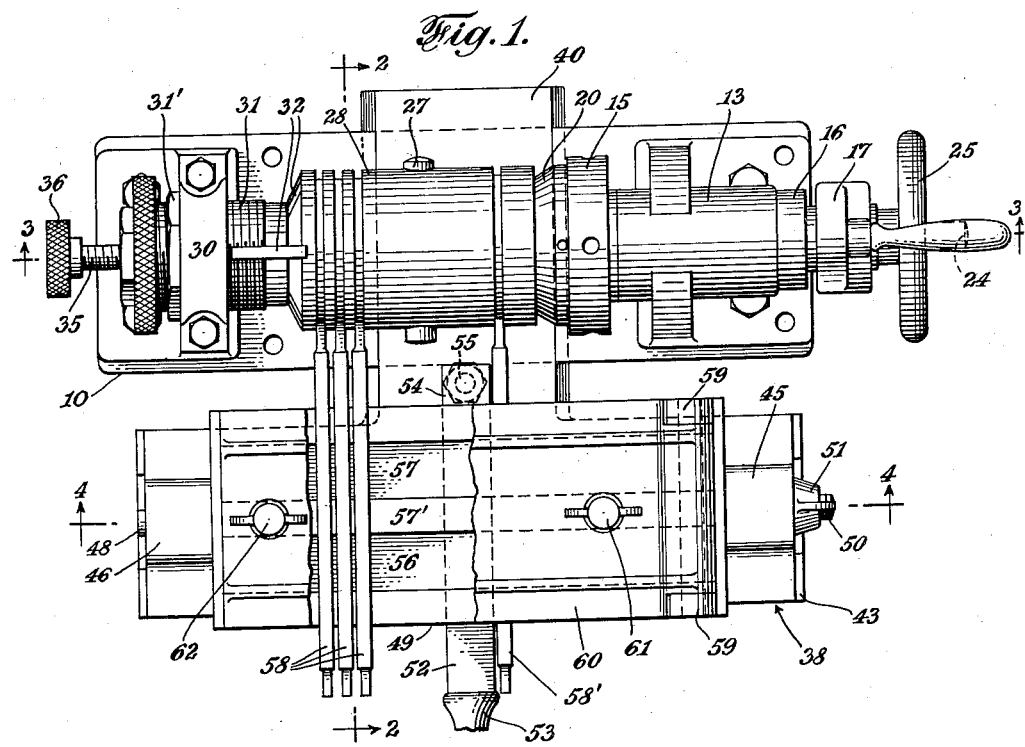
Fig. 1 is a top view of one of the presently preferred forms of the device.

Referring now specifically to Figs. 1, 2, 3 and 4, there is illustrated a piston-holding fixture having a base 10 intended for attachment to and support by a bench or the like, and from which base extend two end brackets 11 and 12. Bracket 11 is provided with a bearing 13 in which is rotatably lodged a sleeve 14 provided at its inner end with an enlargement or head 15. The other or outer end of sleeve 14 extends outward from bearing 13, and a set collar 16 prevents axial movement of the sleeve in respect to bearing 13. At the extreme outer end of the sleeve there are provided means for rotating the sleeve, such as handle 17, when the device is to be operated manually. Obviously the handle may be replaced by a wheel or pulley, not shown, for driving the device by power.

Head 15 is concentrically recessed at 18, which recess is provided with an internal thread for the reception of the threaded extension 19 of an exchangeable piston centering cone frustum 20. This frusto cone, as well as sleeve 14, having a central passage in which is axially movable a spindle 21. At the inner end of the spindle there is removably and adjustably secured an eye member 22, rendered adjustable in relation to spindle 21 by means of threads and a lock nut 23. The other end of the spindle is also threaded, as at 24, and is engaged by a wheel nut 25, bearing against the end of sleeve 14. By means of that wheel nut the axial adjustment of the spindle in relation to sleeve 14 is facilitated. Eye piece or eye member 22 is provided with an elliptical or elongated slot or opening 26 for the reception of a pin 27 which is adapted to be passed through and to engage at one time both wrist pin bearings of piston 28. When pin 27 is thus placed, wheel nut 25 is turned and moves spindle 21 in outward direction. This outward movement of the spindle draws the piston against frusto cone 20, and the interior edge of the hollow piston end is brought into engagement with the cone surface, and the piston body becomes fairly correctly centered and firmly supported by the frusto cone.

In order to assure a more accurate positioning of the piston, it is preferred to provide centering means also at the other or closed end of the piston. One type of such centering means is shown supported by bracket 12, wherein a rotary bushing 29 is journaled in suitable bearings 30. Bushing 29 is internally threaded for the reception of an externally and internally threaded sleeve 31, provided with lock nut 31', and in which sleeve are operatively mounted adjustable, bell crank-shaped gripping jaws 32 having multiple-step gripping faces 33 for engaging the outer edge of the closed piston end. Held by the internal threads of sleeve 31 is a bushing 34 in which operates a threaded pin 35 provided with a knob 36 at its outer end and with a cone-shaped spreader 37 at its inner end. This spreader is adapted to engage the internal legs of gripping jaws 32 and move their outer, piston-gripping ends against the piston, when pin 35 is moved inwards. When the pin is moved outwardly, spreader 37 effects the release of the piston by the jaws. The entire centering arrangement supported by bracket 12 is in axial alignment with spindle 21 and with the rotary assembly lodged in bracket 11. Thus when the closed end of piston 28 is gripped by jaw 32, and the hollow piston end is held against cone 20, the piston becomes truly centered. In that centered position the piston may be revolved during the groove cleaning operation.

In base 10 there is slidably mounted a substantially T-shaped tool support 38, the center bar or extension 40 of which is in dove-tail engagement with base 10, and is provided with a central slot 41 for accommodating a holding screw 42 mounted in and projecting from the base, and by means of which screw extension 40 may be held in adjusted position. The cross bar in the T-shaped support constitutes a mounting 43 for carriage 44, which is slidable longitudinally in and which is adjustable relative to said support, and which is adapted to be locked in adjusted position by one or more bolts 44', and from which carriage extend upright posts 45 and 46. In these posts are pivotally lodged pins 47 and 48, their inner, threaded ends projecting into the body of tool rest 49. Pin 47 extends outwardly and is threaded at 50, the threaded portion being engaged by a lock nut 51.

Figure 2:
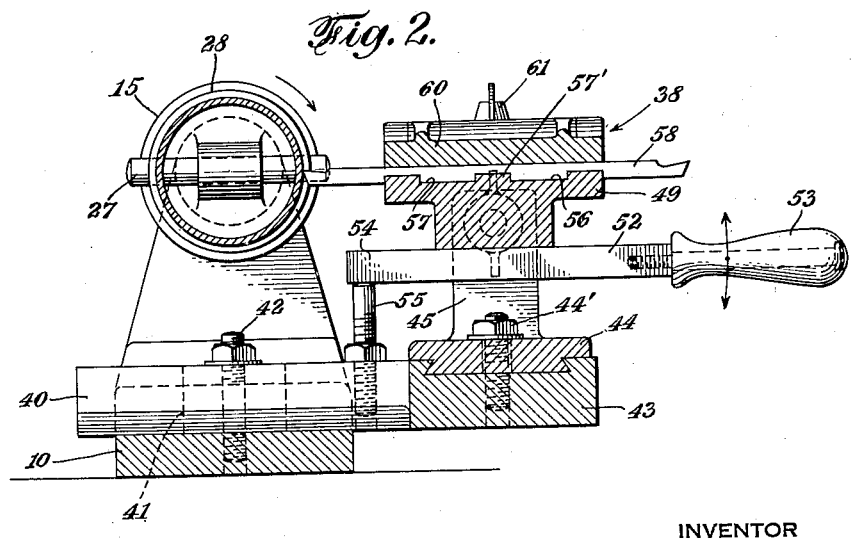
Fig. 2 is a vertical section therethrough taken on line 2—2 of Fig. 1.

At the bottom of tool rest 49 there will be observed a tiltable adjusting bar 52, terminating at one end in a handle 53, while the other end 54 projects beyond the tool rest and over tool support extension 40. Beneath end 54 of the adjusting bar there is arranged an adjustable stop screw 55 against which this bar end is to rest during the scraping operation to prevent tilting of the tool rest, it being assumed that the piston is rotated in clockwise direction, as indicated in Fig. 2 by arrow. The bottom member of the tool rest is provided with two parallel recesses 56 and 57, extending over substantially the entire length of the tool rest, and being separated by a raised portion 57'. That portion and the recesses serve for accommodating tool bits 58 which are shaped to correspond with the raised and recessed portions of the tool rest. At the right end of the bottom tool rest member are two brackets or ears 59 between which is hingedly and slidably mounted a clamping plate 60. The latter is adapted to engage the upper faces of tool bits 58 and 58' and is forcibly held against these bits by screws 61 and 62.

Operation

The device, as disclosed in Figs. 1 to 4, inclusive, is intended to be operated as follows: First a piston is mounted upon spindle 21 by inserting pin 27 through the wrist pin bearings of the piston and through the oval opening 26 provided in eye member 22. Now the piston is drawn against cone 20 by turning wheel nut 25 of spindle 21. The wheel nut, however, is not yet tightened firmly against the outer end of sleeve 14. Not until the closed end of the piston is properly gripped and centered by the centering device supported in bracket 12 can the wheel nut be finally set. The centering device for the closed piston end is first adjusted by loosening lock nut 31' of sleeve 31 and by moving the sleeve and jaws 32 toward the piston. Now spindle 35 is turned and moves cone 37 in inward direction, thus causing jaws 32 to close and to firmly engage the piston end. Sleeve 31 is then readjusted by turning, thereby moving the piston toward cone 20 until that movement is stopped as the hollow piston end mounts and firmly engages cone 20.

Sleeve 31 is now set in its adjusted position by lock nut 31', and wheel nut 25 is drawn tight against the outer end of sleeve 14. In this manner the piston is firmly held in its correctly centered position and will revolve concentrically when operated by handle 17 or its equivalent.

The next step is the setting of the tool bits in the tool rest. Pistons are usually equipped with three grooves near the closed end and one groove at the bottom or open end of the piston, although variations in the arrangement of the grooves are very common. Also the width of the grooves in many pistons is different. The number of tool bits will correspond to the number of grooves in a piston, and obviously each tool bit must be provided with a cutting edge fitting its respective groove. Clamping plate 60 is swung open and the tools are arranged in parallel relation to one another in the tool rest so that each of the tool bits engages the corresponding groove in the piston at right angles. It is to be observed that the piston grooves are usually of uniform depth and therefore all tool bits may be of uniform length, in other words, the cutting edges of all tool bits may be aligned with one another. When the tool bits are properly set, clamping plate 60 is swung down and is fastened by screws 61 and 62 against the tool bits so that the latter are firmly held in position.

Now the entire support is moved towards the piston until it assumes the position indicated in Fig. 2, at which the cutting edge of each tool bit engages the bottom of its respective groove. Ordinarily the front cutting edge of the tool should be substantially in a horizontal plane passing through the center axis of the piston. Slight variations, however, in the tool setting may be advantageous and can be readily effected by the adjustment of bar 52. This bar also serves for swinging the entire tool support away from the piston in case of an emergency, such as the "digging in" of one or the other of the tool bits, or at any moment during or after the finish of the groove scraping operation. A slight sidewise adjustment of the tool bits may be made by moving carriage 44 in respect to the tool support mounting 43, and in which adjusted position it is held by bolt 44'.

When the tool bits are correctly set, which operation takes only a few seconds, the piston is rotated against the cutting edges of the bits, as indicated by the arrow in Fig. 2. Usually one full turn of the piston will suffice to scrape the grooves clean. If, however, the operation must be repeated, a slight adjustment of the tool support in respect to the piston is advisable.

I claim:

1. In a device of the class indicated, a tool holder comprising a longitudinally adjustable carriage, a tool rest composed of a tool supporting member, the latter being pivotally lodged between the ends of said carriage, and a tool clamping member adapted to cooperate with said tool supporting member, the latter member having longitudinally extending raised portions, at least one piston groove scraping tool provided with recesses corresponding to the raised portions of the tool supporting member resting upon the latter member and being held thereagainst by said clamping member, and a tiltable tool rest adjusting bar extending from said tool supporting member.

2. In a device of the class indicated, a tool holder including a longitudinally adjustable carriage, a tool rest comprising a bottom or tool supporting member and a top or tool clamping member, the bottom member being pivotally lodged between the ends of said carriage, means for urging the tool clamping member against the bottom member, the latter having longitudinally extending raised tool guides, piston groove scraping tools supported by the bottom member and being provided with guide recesses corresponding to and registering with the tool guides of the bottom member said guide recesses of the tools and the tool guides of the bottom member being adapted to retain the tools at substantially right angles to the tool rest, said tools being adjustable relative to said bottom member along its tool guides, and means for tilting the tool rest extending from the bottom member.

LEON B. MILLER.

REFERENCES CITED

The following references are of record in the file of this patent:

UNITED STATES PATENTS

| Number | Name | Date |
|---|---|---|
| 67,630 | Burdge | Aug. 13, 1867 |
| 85,629 | Zufelt et al. | Jan. 5, 1869 |
| 144,128 | Parmelee | Oct. 28, 1872 |
| 148,657 | Bodine | Mar. 17, 1874 |
| 1,414,190 | Koehler | Mar. 25, 1922 |
| 1,416,843 | La Bonte | May 23, 1922 |
| 1,491,847 | Creed | Apr. 29, 1924 |
| 1,515,636 | Wagner | Nov. 18, 1924 |
| 1,626,953 | Muller | May 3, 1927 |
| 1,768,692 | Kaplan | July 1, 1930 |
| 1,947,957 | Tillman | Feb. 20, 1934 |
| 2,050,828 | Buell | Aug. 11, 1936 |
| 2,119,004 | Bowser | May 31, 1938 |
| 2,370,918 | Rohl | Mar. 6, 1945 |
| 2,375,196 | Grigalauski | May 15, 1945 |
| 2,382,892 | McGuinness | Aug. 14, 1945 |

FOREIGN PATENTS

| Number | Country | Date |
|---|---|---|
| 21,828/29 | Australia | July 14, 1930 |